(12) United States Patent
Tomizu (10) Patent No.: US 8,391,916 B2
(45) Date of Patent: Mar. 5, 2013

(54) WIRELESS COMMUNICATION TERMINAL APPARATUS AND COMPUTER READABLE MEDIUM THEREFOR

(75) Inventor: Makoto Tomizu, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 804 days.

(21) Appl. No.: 11/574,960

(22) PCT Filed: Sep. 7, 2005

(86) PCT No.: PCT/JP2005/016439
§ 371 (c)(1),
(2), (4) Date: Jan. 23, 2008

(87) PCT Pub. No.: WO2006/028145
PCT Pub. Date: Mar. 16, 2006

(65) Prior Publication Data
US 2008/0261648 A1   Oct. 23, 2008

(30) Foreign Application Priority Data
Sep. 9, 2004   (JP) ................................. 2004-262112

(51) Int. Cl.
*H04M 1/00* (2006.01)
(52) U.S. Cl. ..................... 455/552.1; 455/553.1; 455/19
(58) Field of Classification Search ............... 455/552.1, 455/19, 550.1, 553.1, 448, 451, 82–83
See application file for complete search history.

(56) References Cited

U.S. PATENT DOCUMENTS

| | | | | |
|---|---|---|---|---|
| 6,456,858 B1 * | 9/2002 | Streter | ....................... | 455/552.1 |
| 6,640,115 B1 * | 10/2003 | Fujimoto et al. | ............... | 455/567 |
| 7,526,313 B2 * | 4/2009 | Mousseau et al. | ......... | 455/552.1 |
| 2005/0013264 A1 * | 1/2005 | Sundberg | ..................... | 370/328 |
| 2005/0047373 A1 * | 3/2005 | Kojima | ......................... | 370/331 |
| 2005/0049021 A1 * | 3/2005 | Nedelcu et al. | ............. | 455/575.9 |
| 2005/0153733 A1 * | 7/2005 | Park et al. | ................... | 455/552.1 |
| 2005/0266874 A1 * | 12/2005 | Lai et al. | ..................... | 455/552.1 |
| 2006/0211447 A1 * | 9/2006 | Purkayastha et al. | ...... | 455/552.1 |
| 2007/0142047 A1 * | 6/2007 | Heeschen et al. | .......... | 455/435.1 |
| 2007/0213015 A1 * | 9/2007 | Nagano et al. | .................. | 455/83 |
| 2009/0191864 A1 * | 7/2009 | Mousseau et al. | ......... | 455/426.1 |

FOREIGN PATENT DOCUMENTS

| | | | |
|---|---|---|---|
| JP | 2001-145156 | | 5/2001 |
| JP | 02001145156 A | * | 5/2001 |
| JP | 2003-298762 | | 10/2003 |
| JP | 2004-228704 | | 8/2004 |

* cited by examiner

*Primary Examiner* — Jinsong Hu
*Assistant Examiner* — Magdi Elhag
(74) *Attorney, Agent, or Firm* — DLA Piper LLP (US)

(57) ABSTRACT

A wireless communication terminal having a radio section that performs switching between a first communication system and a second communication system to execute wireless communication by a shared antenna, and a control section for controlling the wireless communication executed by the radio section, wherein the control section monitors an incoming call in the second communication system during communication by the first communication system, when the incoming call is detected, the control section switches from the first communication system to the second communication system for a predetermined first time in which communication by the first communication system is not disconnected, and after the predetermined first time elapses, the control section switches from the second communication system to the first communication system to resume the communication by the first communication system.

8 Claims, 5 Drawing Sheets

WIRELESS COMMUNICATION TERMINAL APPARATUS AND COMPUTER READABLE MEDIUM THEREFOR

TECHNICAL FIELD

The present invention relates to a wireless communication terminal for executing communication by a shared antenna by switching two communication systems, and more particularly, the communication system switching technology.

BACKGROUND ART

The wireless communication terminal of the system (dual system) that executes communication with a base station by switching two communication systems is known. As the wireless communication terminal of such dual system, a mobile terminal equipped with means for switching a CDMA2000 1× communication system and a CDMA2000 1× EVDO communication system has been proposed (see Patent Literature 1, for example).

Also, as the dual system wireless communication terminal, a wireless communication terminal has been proposed that shares one antenna with two communication systems and communicates by either of the communication systems by switching the communication system that uses the antenna as required (hybrid system).

Patent Literature 1: JP-A-2003-298762

DISCLOSURE OF THE INVENTION

Problems That the Invention is to Solve

The above-described hybrid terminal monitors an incoming call in the other system while the terminal executes data communication in one system.

Figure 6:
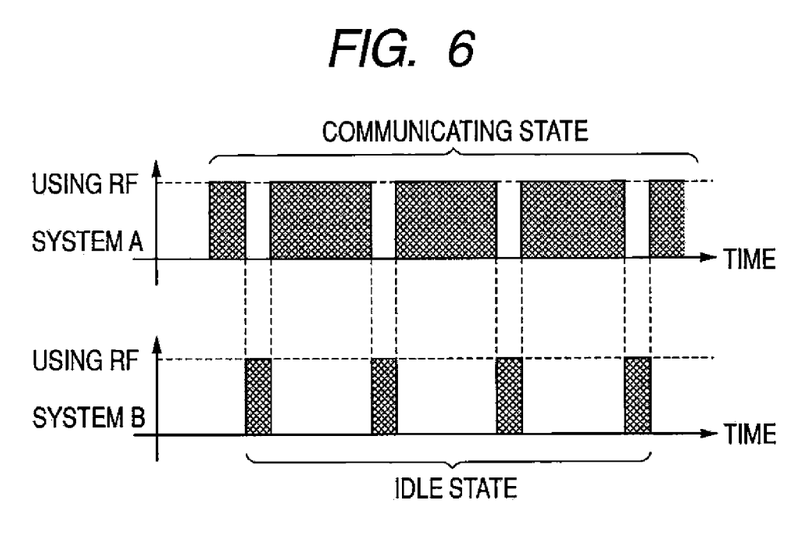
FIG. 6 A timing chart showing switching of communication systems in the related art.

For example, as shown in FIG. 6, the hybrid terminal monitors an incoming call in a system B (CDMA2000 1×) by switching to the system B at a predetermined time interval when the terminal is communicating by a system A (CDMA2000 1× EVDO). Therefore, even when the terminal is communicating by the system A, an idle state is made in the system B.

Figure 7:
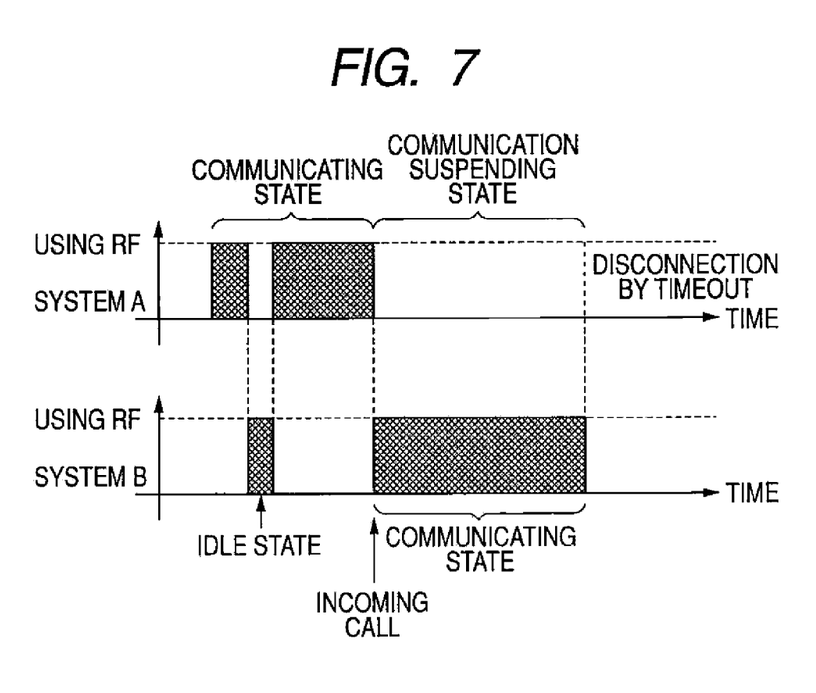
FIG. 7 A timing chart showing switching of communication systems in the related art.

Then, as shown in FIG. 7, when the hybrid terminal receives the incoming call in the system B while communicating by the system A, the terminal switches from the system A to the system B to respond to this incoming call and the terminal is brought to a state of communication by the system B.

Therefore, the communication is suspended in the system A since the system B occupies the antenna.

When a communication suspension time in the system A is prolonged, a timeout of an application used in the communication by the system A is caused. It is feared that data and history information, etc., during the communication are lost.

Even though the connection is still maintained in a data link layer or a physical layer which are lower than the application layer irrespective of this timeout, the user must restart the application to establish the communication once again.

Also, a predetermined timeout value is set beforehand in the physical layer on the base station side to normalize the traffic in the wireless communication network. As a result, the connection between the system A and the base station is disconnected when the timeout is caused in the physical layer.

Means for Solving the Problems

A first invention provides a wireless communication terminal comprising:
a radio section that performs switching between a first communication system and a second communication system to execute wireless communication by a shared antenna; and
a control section for controlling the wireless communication executed by the radio section,
wherein the control section monitors an incoming call in the second communication system during communication by the first communication system,
when the incoming call is detected, the control section switches from the first communication system to the second communication system for a predetermined first time in which communication by the first communication system is not disconnected, and
after the predetermined first time elapses, the control section switches from the second communication system to the first communication system to resume the communication by the first communication system.

In a second invention according to the first invention, the control section starts communication by the second communication system after the incoming call is detected,
suspends the communication by the second communication system after the predetermined first time elapses,
executes the communication by the first communication system for a predetermined second time in which the communication by the second communication system is not disconnected, and
then switches from the first communication system to the second communication system to resume the communication by the second communication system.

In a third invention according to the second invention, the predetermined first time is a time in which disconnection of the communication is not determined by a communication program that is used in the first communication system, and
the predetermined second time is a time in which disconnection of the communication is not determined by a communication program that is used in the second communication system.

A fourth invention provides a computer readable medium having a program that causes a wireless communication terminal apparatus having a radio section that performs switching between a first communication system and a second communication system to execute wireless communication by a shared antenna, and a control section for controlling the wireless communication executed by the radio section, to execute instructions comprising:
monitoring an incoming call in the second communication system during communication by the first communication system;
when the incoming call is detected, switching from the first communication system to the second communication system for a predetermined first time in which communication by the first communication system is not disconnected; and
after the predetermined first time elapses, switching from the second communication system to the first communication system to resume the communication by the first communication system.

A fifth invention according to the fourth invention further comprising the instructions of:
starting communication by the second communication system after the incoming call is detected;
suspending the communication by the second communication system after the predetermined first time elapses;
executing the communication by the first communication system for a predetermined second time in which the communication by the second communication system is not disconnected; and then switching from the first communication system to the second communication system to resume the communication by the second communication system.

Advantages of the Invention

According to the present invention, the wireless communication terminal apparatus comprises:

a radio section that performs switching between a first communication system and a second communication system to execute wireless communication by a shared antenna; and a control section for controlling the wireless communication executed by the radio section, wherein the control section monitors an incoming call in the second communication system during communication by the first communication system, when the incoming call is detected, the control section switches from the first communication system to the second communication system for a predetermined first time in which communication by the first communication system is not disconnected, and after the predetermined first time elapses, the control section switches from the second communication system to the first communication system to resume the communication by the first communication system.

Therefore, even the wireless communication terminal having one antenna can communicate by two communication systems simultaneously.

Also, according to the present invention, the control section resumes communication by the second communication system after the incoming call is detected, suspends the communication by the second communication system after the predetermined first time elapses, executes the communication by the first communication system for a predetermined second time in which the communication by the second communication system is not disconnected, and then switches from the first communication system to the second communication system to resume the communication by the second communication system.

Therefore, even the wireless communication terminal having one antenna can maintain communication by two communication systems simultaneously.

DESCRIPTION OF REFERENCE NUMERALS AND SIGNS 1 antenna
2 RF control section
3 main control section
4A system A protocol control section
4B system B protocol control section

BEST MODE FOR CARRYING OUT THE INVENTION

Embodiments of the present invention will be explained with reference to the drawings hereinafter.

Figure 1:
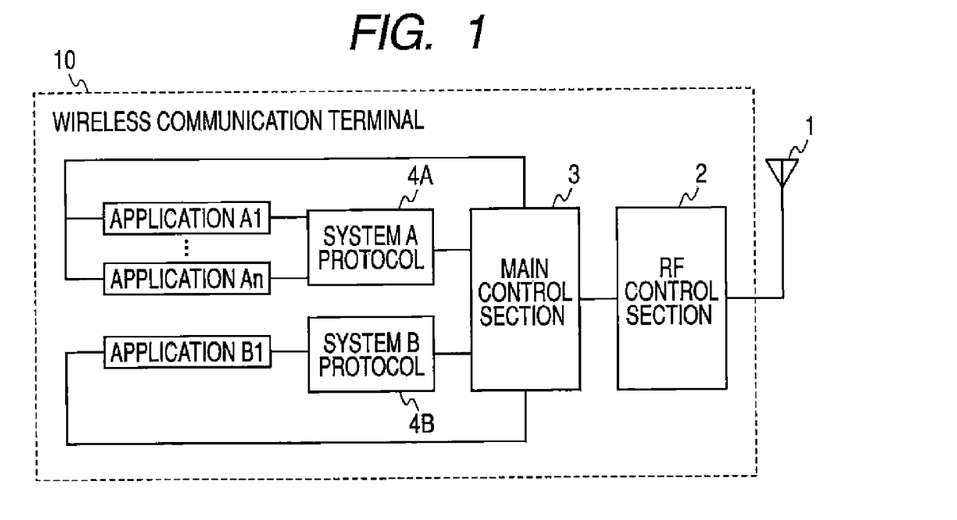
FIG. 1 A block diagram showing a configuration of a wireless communication terminal of a first embodiment of the present invention.

FIG. 1 is a block diagram showing a configuration of a wireless communication terminal 10 of a first embodiment of the present invention.

The wireless communication terminal 10 of the present embodiment performs wireless communication by using a shared antenna 1 by switching CDMA2000 1× EV-DO (1× Evolution Data Only; referred to as "EV-DO" hereinafter) and CDMA2000 1× (referred to as "1×" hereinafter) EV-DO is a communication system for data communication only, and normally the wireless communication terminal 10 executes data communication by the EV-DO system.

Meanwhile, 1× can also execute data communication like EV-DO, but is used mainly for a voice phone call. For the sake of convenience, explanation will be made by referring EV-DO and 1× as the system A and the system B respectively hereunder.

The antenna 1 is connected to an RF control section 2, and receives a radio wave from a radio base station and transmits a radio wave to the radio base station.

The RF control section 2 executes a transmitting/receiving process in compliance with respective radio standards.

That is, an RE section of the system A and an RF section of the system B are included in the RF control section.

The RF section of the system A converts a data signal or an audio signal to be transmitted by the communication system A into a high frequency signal, and then sends it to the antenna 1.

Also, the RF section of the system A converts the high frequency signal from the antenna 1 into the data signal or the audio signal.

The RF section of the system B converts a data signal or an audio signal to be transmitted by the communication system B into a high frequency signal, and then sends it to the antenna 1.

Also, the RF section of the system B converts the high frequency signal from the antenna 1 into the data signal or the audio signal.

Also, a base-band processing section is provided in the RF control section 2.

The base-band processing section demodulates a base-band signal into the audio signal by a CODEC section provided in its inside.

Also, the CODEC section modulates the audio signal and generates the base-band signal.

In addition, the RF control section 2 controls communication of the two communication systems of the systems A, B.

A main control section 3 supervises and controls respective sections of the wireless communication terminal 10. For example, the main control section 3 controls a switching between two systems of the systems A, B by switching system protocol sections 4A, 4B.

That is, the wireless communication terminal 10 of the embodiment of the present invention shares one RF control section 2 with the system A and the system B, and the system that executes the communication occupies the RF control section 2.

Also, the main control section 3 controls start and end of application programs A1 to An and B1 being set for every system. The application programs A1 to An used in the system A are used for the data communication, and include a Web browser, a media player used to view/listen to a streaming video, etc., for example.

In contrast, the system B uses the application program B1 for the voice phone call.

Also, a predetermined time for a timeout is set beforehand for these application programs A1 to An respectively. The timeout occurs when a state in which the processing of transmission/reception data cannot be executed continues for a predetermined time during the communication.

Also, a predetermined time for a timeout is also set beforehand for the application program B1. The timeout occurs when a state in which the processing of the audio signal cannot be executed continues for a predetermined time during the phone call.

In the present embodiment, the "disconnection" of the communication means a situation wherein a timeout of the application program occurs and then the application program has to be restarted to make the communication available.

In the present embodiment, the "suspension" of the communication means a situation wherein the data or the audio signal cannot be processed by the system A protocol 4A or the system B protocol 4B, but the timeout is not occurred in the application program and thus the process of the data or the audio signal can be immediately resumed.

Figure 2:
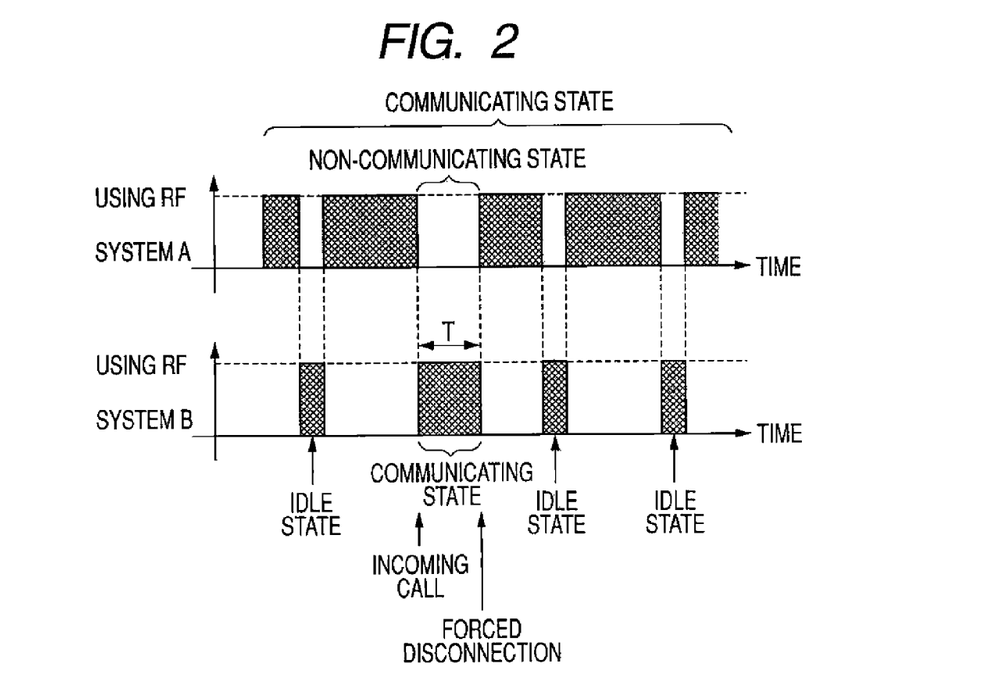
FIG. 2 A timing chart showing switching of communication systems in a first embodiment of the present invention.

FIG. 2 is a timing chart showing switching of communication systems by the first embodiment.

As described above, the hybrid terminal monitors the incoming call in the system B at a predetermined time interval even when the terminal is executing the data communication by the system A.

At this time, when the hybrid terminal detects the incoming call in the system B, the main control section 3 switches from the system A to the system B to respond to this incoming call, and starts the communication by the system B. Since the system B occupies the antenna in response to the start of the communication in the system B, the communication is suspended in the system A.

In the first embodiment, in order not to continue the suspension of the communication by the system A for a long time, the communication by the system B is forcibly disconnected when a communication time by the system B becomes a predetermined time T, and the communication by the system A is resumed.

This predetermined time T is set to a time that the application program being operated for the communication by the system A does not determine as timeout.

Therefore, even when the communication is executed by the system B temporarily, the communication by the system A is not disconnected.

Figure 3:
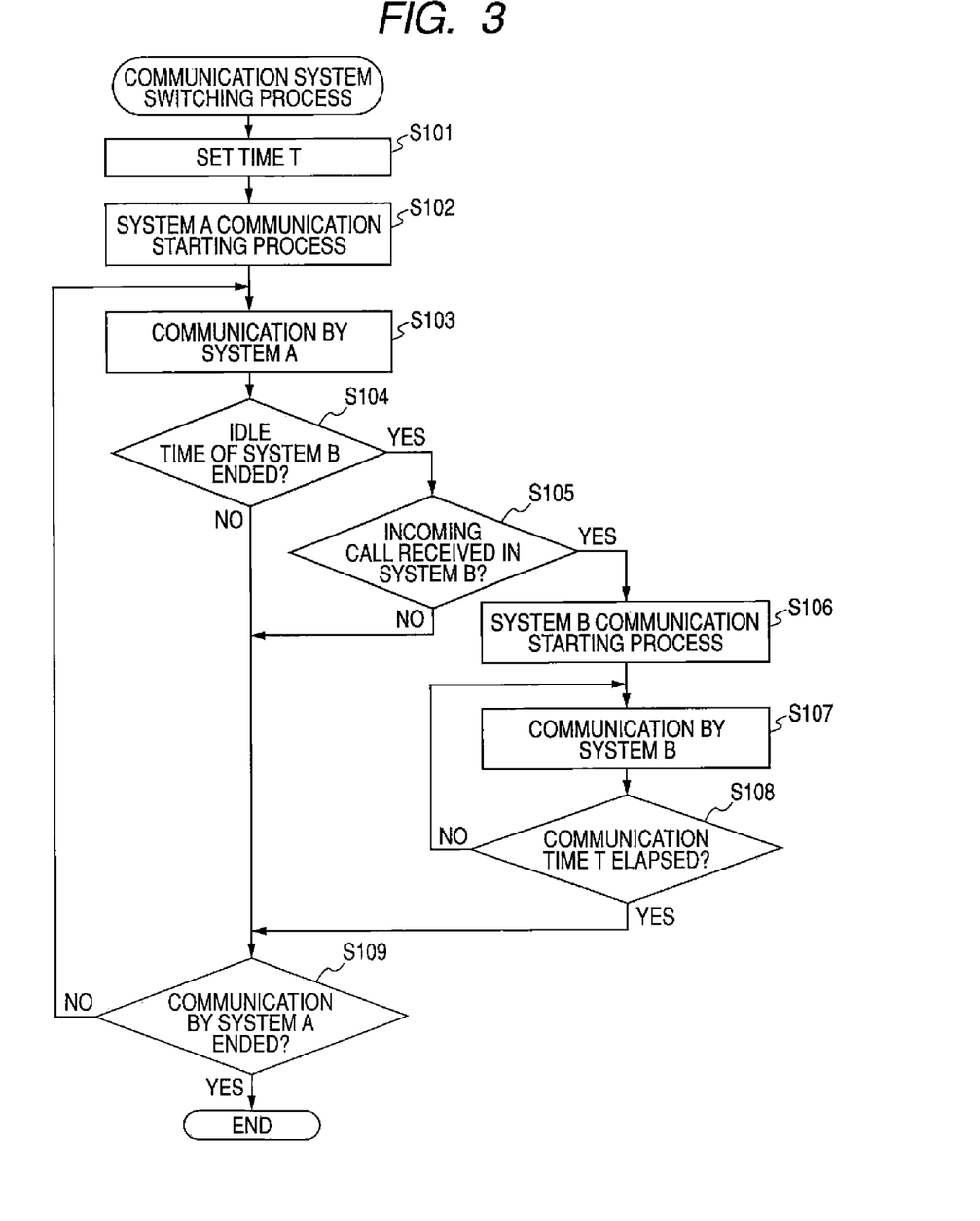
FIG. 3 A flowchart of a communication system switching process in a first embodiment of the present invention.

FIG. 3 is a flowchart of a communication system switching process in the first embodiment, which is executed by the main control section 3.

First, when at least one of the application programs A1 to An for communication is started in the wireless communication terminal 10, a time T during which the communication by the system B is permitted is set based on a timeout value determined by the application (S101).

As described above, this communication permissible time T is determined within a range that the application program executed for the communication by the system A does not determine as a timeout and thus the communication is not disconnected.

Then, a communication starting process of the system A is executed (S102), and then the communication by the system A using the started application program for communication is executed (S103). That is, the system A establishes the connection with a communication destination via the base station (not shown) and starts the transmission/reception of the data.

At this time, the system A occupies the antenna 1.

Then, even during the communication by the system A, switching from the system A to the system B is made at a predetermined time interval, and the incoming call on the system B is monitored for the system B to be idle. At this time, the system B occupies the antenna 1.

A timer is activated during the idle state of the system B. Whether or not an idle time of the system B has ended is determined by the timer (S104).

If the idle time of the system B has not ended, the process goes to step S109.

On the other hand, if the idle time of the system B has ended, whether or not the incoming call has been received in the system B within the idle time is determined (S105).

If the incoming call has not been detected in the system B, the process goes to step S109.

On the other hand, if the incoming call has been detected in the system B, switching from the system A to the system B is made and a communication starting process in the system B is executed by starting the application B (S106). Then, the communication by the system B is executed (S107).

At this time, since the antenna 1 is occupied by the system B, the system A cannot process the data transmitted from the base station or the data transmitted to the base station. But the data and the communication history information in the midst of communication are held on the application program.

The timer is operated during the communication by the system B. Then, whether or not the permissible communication time T in the system B has elapsed is determined by the timer (S108).

As a result, when the permissible communication time T in the system B has elapsed, the communication by the system B is ended and switching from the system B to the system A is made. Then, the process goes to step S109.

Here, the system A occupies the antenna 1 again, and the system A resumes the processing of the data transmitted from the base station or the data transmitted to the base station.

On the other hand, if the elapsed time is within the permissible communication time T in the system B, the system B has time to spare until a timeout occurs in system A. Therefore, the process goes back to step S107 and the communication by the system B is continued.

In S109, whether or not the communication by the system A has ended is determined.

For example, when the application program started for the communication by the system A has ended, it is determined that the communication by the system A has ended. Thus, this communication system switching process is ended.

On the other hand, if the continuation of the communication by the system A is needed, the process goes back to step S103. Then, the communication by the system A is continued.

As described above, in the first embodiment of the present invention, even though the incoming call is received in the system B during the communication by the system A, and then the system B responds to the incoming call, the communication by the system B is suspended prior to a lapse of the timeout value at which the connection by the system A is disconnected. Then, the communication goes back to the original system A.

As a result, even the wireless communication terminal having one RF section can perform communication by two communication systems simultaneously.

Next, a second embodiment of the present invention will be explained hereunder.

The second embodiment is similar to the foregoing first embodiment in a configuration of the wireless communication terminal 10 except that a method of managing a communication time in the system B is different.

In this case, the same references are affixed to the same configurations as those in the above first embodiment, and their explanation will be omitted herein.

Figure 4:
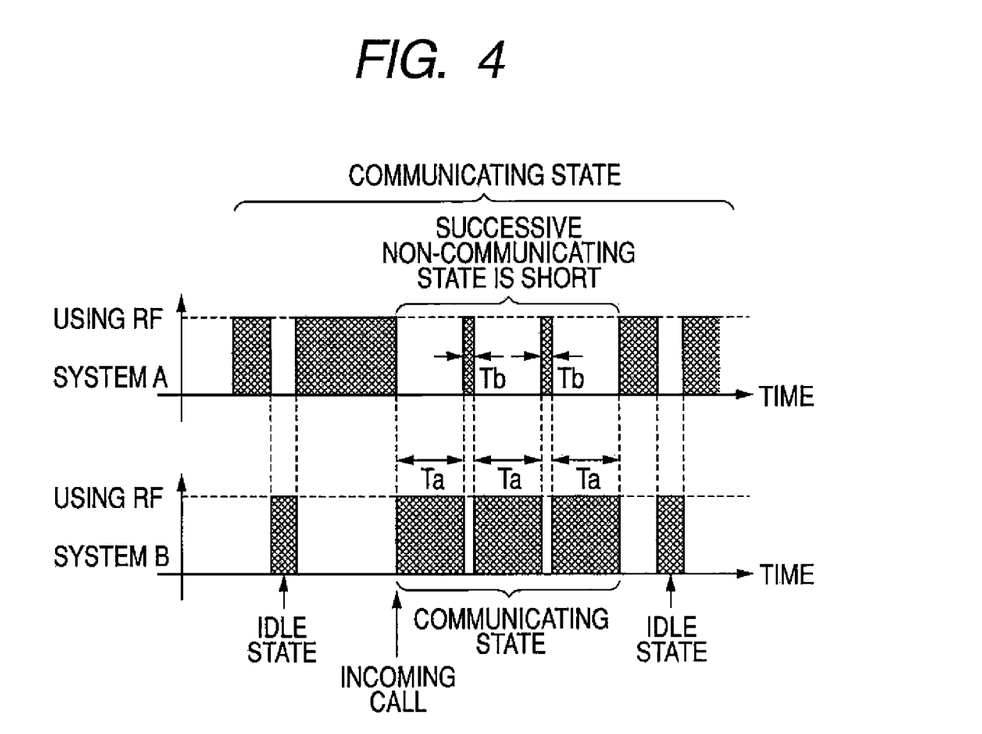
FIG. 4 A timing chart showing switching of communication systems in a second embodiment of the present invention.

FIG. 4 is a timing chart showing switching of a communication system according to the second embodiment.

As described above, even when the hybrid terminal is performing the data communication by the system A, the terminal monitors for an incoming call in the system B at a predetermined time interval.

At this time, when the incoming call in the system B is detected, the main control section 3 switches from the system A to the system B to respond to this incoming call, and then starts the communication by the system B.

Since the antenna 1 is occupied by the system B by the communication started by the system B, the communication by the system A is suspended.

In the second embodiment, in order not to continue the suspension of the communication by the system A for a long time, the communication by the system B is suspended when a communication time of the system B becomes a predetermined time Ta, and then the switching temporarily returns to the system A.

This predetermined time Ta is set to a time in which the application program being operated for the communication by the system A does not determine as a timeout.

Therefore, even when the communication is executed temporarily by the system B, the communication by the system A is not disconnected.

When the switching temporarily returns to the system A after the communication by the system B is suspended, a process for preventing the suspension of the communication by the system A is executed in the system A.

For example, the communication by the system A is executed by either resuming the data transmission/reception by the system A once or by transmitting a ping.

Then, when a predetermined time Tb expires, the main control section 3 switches from the system A to the system B, and resumes the communication by the system B.

This predetermined time Tb is set to a time in which the application program B1 being operated for the voice communication by the system B does not determine as a timeout.

The system B resumes the communication after a time Tc. This time Tc is a time that is longer than the time Tb required for the process of preventing the suspension of the communication by the system A, and Tc is set to a time in which the application program being operated for the communication by the system B does not detect a timeout.

Then, the communication on both systems can be maintained by repeating the switching operation of the system A and the system B until the communication by the system B is completed.

In other words, in the second embodiment, the communication in the system A is substantially suspended during the communication by the system B, nevertheless the timeout of the applications of the system A and the system B can be prevented by shortening the successive communication suspension time.

Therefore, the communication by the system B can be carried out without disconnecting the communication by the system A.

Figure 5:
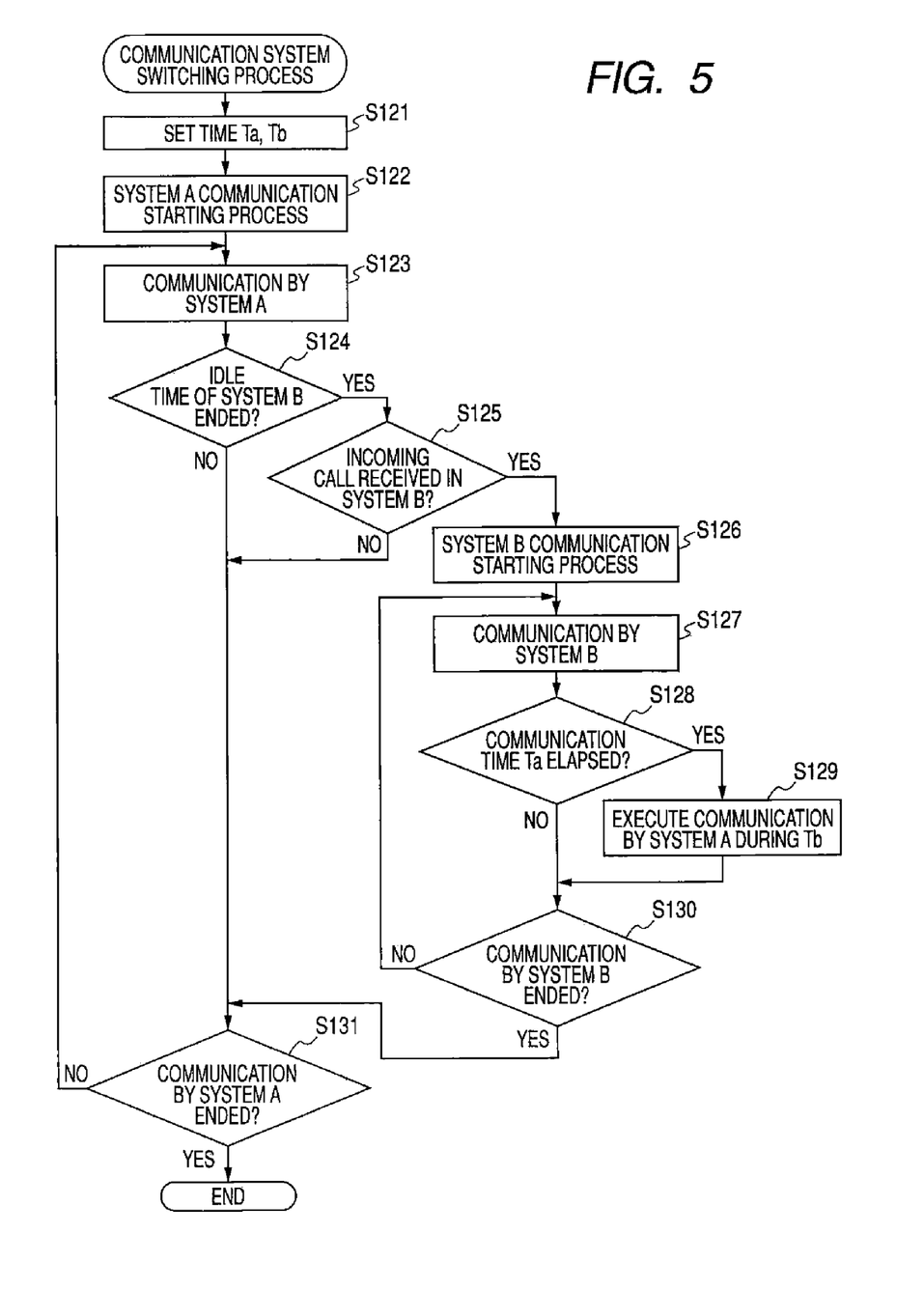
FIG. 5 A flowchart of a communication system switching process in a second embodiment of the present invention.

FIG. 5 is a flowchart of a communication system switching process in the second embodiment, which is executed by the main control section 3.

First, when at least one of the application programs A1 to An for communication is started in the wireless communication terminal 10, the system switching times Ta, Tb, Tc determined by the application are set (S121)

As described above, this communication permissible time Ta is determined within a range that the application program executed for the communication by the system A neither determines as a timeout nor disconnects the communication.

Also, as described above, the communication permissible time Tb is determined within a range that the application program executed for the communication by the system B neither determines as a timeout nor disconnects the communication.

Then, a communication starting process by the system A is executed by using the operated application program for communication (S122), and then the communication by the system A is executed (S123). That is, the system A establishes the connection with the communication destination via the base station (not shown), and starts the transmission/reception of the data.

At this time, the system A occupies the antenna 1. In this case, since the processes in steps S123 to S127 are similar to the processes in steps S103 to S107 in the above first embodiment, their explanations are omitted herein.

The timer is operated during the communication by the system B (S127). Then, whether or not the permissible communication time Ta in the system B has elapsed is determined by the timer (S128).

As a result, if the permissible communication time Ta in the system B has elapsed, switching from the system B to the system A is made and then the communication by the system A is executed for a period of the permissible communication time Tb in the system A (S129).

The system B counts a time to decide whether or not the time Tb has elapsed. If the time Tb has elapsed, switching from the system A to the system B is made and the communication by the system B is resumed.

Then, whether or not the communication by the system B has ended is determined (S130).

For example, if the application program B1 started for the communication by the system B has ended, it is determined that the communication by the system B has ended and the process goes to step S131. On the other hand, if the continuation of the communication by the system B is needed, the process goes back to step S127 and the communication by the system B is continued.

In step S131, whether or not the communication by the system A has ended is determined (S131). For example, if the application program started for the communication by the system A has ended, it is determined that the communication by the system A has ended and the communication system switching process is ended.

On the other hand, if the continuation of the communication by the system A is needed, the process goes back to step S123 and the communication by the system A is continued.

As explained above, in the second embodiment of the present invention, even when the incoming call is received in the system B during the communication by the system A and then the response to this incoming call is made by the system B, the switching periodically returns to the original system A. Then, the short time communication is executed by the system A.

Then, the switching to the system B is made again, and the communication by the system B is executed.

As a result, even the wireless communication terminal having one antenna can maintain the communication by two communication systems simultaneously.

In the second embodiment, when at least one of the application programs A1 to An for the system A is started, the permissible communication time Tb in which the application program B1 for the system B neither 5 determines as a timeout nor disconnects the communication is set (S121). But the present invention is not limited to this mode.

For example, the permissible communication time Tb may be set when the incoming call in the system B is detected in step S125, switching from the system A to the system B is made, and also the application program B1 is started. In addition, the permissible communication time Tb may be set when the permissible communication time Ta has elapsed in step S128, and the switching from the system B to the system A is made in step S129.

Also, in the first embodiment and the second embodiment, the state in which the timeout is occurred in the application programs A1 to An and B1 is regarded as "disconnected." However, this is a case determined by the application layer, and the present invention is not limited to this mode.

Further, for example, a predetermined time is set beforehand on the base station side to normalize the traffic in the wireless communication network. Thus, when the state in which the data transmission/reception is not carried out continues for a predetermined time, the timeout occurs.

By regarding this timeout state as "disconnected," the determination may be made by the physical layer.

Also, in the present embodiments, explanation is made under the assumption that CDMA2000 1× EV-DO and CDMA2000 1× are set as the system A and the system B respectively. But the present invention is not limited to this condition. Any communication system may be employed as the system A if such system can handle the data communication. Also, any communication system may be employed as the system B if such system can handle the voice communication and monitor the incoming call intermittently while the system A is performing communication.

INDUSTRIAL APPLICABILITY

According to the embodiments of the invention, even in the wireless communication terminal having one antenna, communication can be performed by two communication systems simultaneously. Therefore, the present invention has great industrial applicability.

The invention claimed is:

1. A wireless communication terminal comprising:
a radio section that performs switching between a first communication system and a second communication system to execute wireless communication by a shared antenna;
a control section for controlling the wireless communication executed by the radio section; and
a setting section,
wherein the control section monitors an incoming call in the second communication system during communication in the first communication system performed by one of a plurality of application programs,
wherein the setting section sets a first time according to the application program used in current communication in the first communication system,
wherein when the incoming call is detected, the control section switches from the first communication system to the second communication system for the first time in which communication by the first communication system is not disconnected, and
wherein after the first time elapses, the control section switches from the second communication system to the first communication system, to resume the communication by the first communication system.

2. The wireless communication terminal according to claim 1, wherein the control section
starts communication by the second communication system after the incoming call is detected,
suspends the communication by the second communication system after the first time elapses,
executes the communication by the first communication system for a second time in which the communication by the second communication system is not disconnected, and
then switches from the first communication system to the second communication system to resume the communication by the second communication system.

3. The wireless communication terminal according to claim 2, wherein
the first time is a time determined within a range in which disconnection of the communication is not determined by the application program that is used in the first communication system, and
the second time is a time determined within a range in which disconnection of the communication is not determined by an application program that is used in the second communication system.

4. A non-transitory computer readable medium storing a program that causes a wireless communication terminal having a radio section that performs switching between a first communication system and a second communication system to execute wireless communication by a shared antenna, and a control section for controlling the wireless communication executed by the radio section, to perform processes comprising:
monitoring an incoming call in the second communication system during communication in the first communication system performed by one of a plurality of application programs,
setting a first time according to the application program used in current communication in the first communication system,
when the incoming call is detected, switching from the first communication system to the second communication system for the set first time in which communication by the first communication system is not disconnected; and
after the first time elapses, switching from the second communication system to the first communication system to resume the communication by the first communication system.

5. The non-transitory computer readable medium storing the program according to claim 4, causing the wireless communication terminal to further perform processes of:
starting communication by the second communication system after the incoming call is detected;
suspending the communication by the second communication system after the set first time elapses;
executing the communication by the first communication system for a second time in which the communication by the second communication system is not disconnected; and
then switching from the first communication system to the second communication system to resume the communication by the second communication system.

6. The non-transitory computer readable medium having the program according to claim 5, wherein the first time is a time determined within a range in which disconnection of the communication is not determined by the application program that is used in the first communication system, and the second time is a time determined within a range in which disconnection of the communication is not determined by an application program that is used in the second communication system.

7. The wireless communication terminal according to claim 1, wherein each of the application programs has a timeout period, and the setting section sets the first time as being shorter than the timeout period of the application program used in the current communication in the first communication system.

8. A wireless communication terminal comprising:

a wireless communication section that performs wireless communication in a first communication system and a second communication system with a shared antenna by switching therebetween;

a storage section that stores a plurality of application programs for performing communication in the first communication system;

a control section that selects one of the plurality of application programs for performing the communication in the first communication system; and a setting section that sets a first time according to the application program selected by the control section; wherein the control section controls the wireless communication by the wireless communication section, and the control section monitors an incoming call in the second communication system during the communication in the first communication system performed by the selected application program, when the incoming call is detected, the control section switches from the first communication system to the second communication system for the first time set by the setting section, and after the first time elapses, the control section switches from the second communication system to the first communication system to resume the communication by the first communication system.

* * * * *